(12) United States Patent
Colibert

(10) Patent No.: US 7,506,885 B2
(45) Date of Patent: Mar. 24, 2009

(54) LOAD-LEVELING, WEIGHT-DISTRIBUTING HITCH SYSTEM

(75) Inventor: Floyd A. Colibert, West Jordan, UT (US); Janet M. Colibert, legal representative, West Jordan, UT (US)

(73) Assignee: Colibert Enterprises, Salt Lake City, UT (US)

( * ) Notice: Subject to any disclaimer, the term of this patent is extended or adjusted under 35 U.S.C. 154(b) by 131 days.

(21) Appl. No.: 10/939,948

(22) Filed: Sep. 13, 2004

(65) Prior Publication Data

US 2005/0057019 A1  Mar. 17, 2005

Related U.S. Application Data

(63) Continuation-in-part of application No. 10/839,071, filed on May 4, 2004, now abandoned, which is a continuation-in-part of application No. 10/679,825, filed on Oct. 6, 2003, now abandoned, which is a continuation of application No. 09/005,670, filed on Jan. 12, 1998, now Pat. No. 6,629,701.

(51) Int. Cl.
*B62D 53/00* (2006.01)

(52) U.S. Cl. .................. 280/405.1; 280/455.1

(58) Field of Classification Search .......... 280/455.1, 280/405.1, 406.2, 432, 511, 407
See application file for complete search history.

(56) References Cited

U.S. PATENT DOCUMENTS

| | | | |
|---|---|---|---|
| 2,817,541 A | 12/1957 | Mathisen |
| 2,952,475 A | 9/1960 | Reese |
| 3,151,879 A | 10/1964 | Bock |
| 3,471,169 A | 10/1969 | Palage |
| 3,600,004 A | 8/1971 | Newkirk |
| 3,645,560 A | 2/1972 | Steele |
| 3,649,046 A | 3/1972 | Mathisen |
| 3,679,231 A | 7/1972 | Derr, Jr. |
| 3,679,232 A | 7/1972 | Weber |
| 3,690,699 A | 9/1972 | Derr, Jr. |
| 3,692,331 A | 9/1972 | Vegors |
| 3,700,261 A | 10/1972 | Suckow |
| 3,700,262 A | 10/1972 | Suckow |
| 3,730,554 A | 5/1973 | Saunders |
| 3,731,746 A | 5/1973 | Walberg |
| 3,731,950 A | 5/1973 | Burcham |
| 3,756,618 A | 9/1973 | Lewis |
| 3,778,088 A | 12/1973 | Alexander |
| 3,779,407 A | 12/1973 | Gillem |
| 3,825,132 A | 7/1974 | Colangelo |
| 3,847,228 A | 11/1974 | Slosiarek et al. |

(Continued)

*Primary Examiner*—Tony H. Winner
(74) *Attorney, Agent, or Firm*—Thorpe North & Western LLP

(57) ABSTRACT

A load-leveling, weight-distributing hitch system includes a hitch head, configured for attachment to a rear of a towing vehicle, a T socket, horizontally pivotally attached to the hitch head, a spring bar, having a forward end removably attached to the T socket, a tension member, connected to a rearward end of the spring bar, and a spring bar lift, configured for attachment to the tongue of a trailer. The spring bar lift is configured to apply tension to the tension member, so as to lift the rearward end of the spring bar, and thereby transmit a moment to the hitch head tending to lift the rear of the towing vehicle.

23 Claims, 7 Drawing Sheets

U.S. PATENT DOCUMENTS

| | | |
|---|---|---|
| 3,871,686 A | 3/1975 | Rendessy |
| 3,910,604 A | 10/1975 | Abromavage et al. |
| 3,948,567 A | 4/1976 | Kasselmann et al. |
| 3,964,768 A | 6/1976 | Reynolds |
| 3,989,269 A | 11/1976 | Rendessy |
| 4,023,863 A | 5/1977 | Sisson et al. |
| 4,025,085 A | 5/1977 | Jacobs |
| 4,049,288 A | 9/1977 | Young |
| 4,053,174 A | 10/1977 | Guettler, Jr. |
| 4,165,885 A | 8/1979 | Good et al. |
| 4,198,073 A | 4/1980 | Olsen |
| 4,211,427 A | 7/1980 | Young et al. |
| 4,213,627 A | 7/1980 | Thompson |
| 4,312,516 A | 1/1982 | Olsen |
| 4,411,444 A | 10/1983 | Holloway |
| 4,637,770 A | 1/1987 | Swadell |
| 4,687,219 A | 8/1987 | Rendzio |
| 4,711,106 A | 12/1987 | Johnson |
| 4,714,265 A | 12/1987 | Franklin |
| 4,722,542 A | 2/1988 | Hensley |
| 4,811,965 A | 3/1989 | Eubanks |
| 4,815,752 A | 3/1989 | Young et al. |
| 5,184,839 A | 2/1993 | Guedry |
| 5,284,038 A | 2/1994 | Johnson |
| 5,363,924 A | 11/1994 | Foley et al. |
| 5,375,867 A | 12/1994 | Kass et al. |
| 5,421,599 A | 6/1995 | Maines |
| 5,451,088 A | 9/1995 | Broad |
| 5,454,550 A | 10/1995 | Christopherson |
| 5,465,991 A | 11/1995 | Kass et al. |
| 5,489,111 A | 2/1996 | Collins |
| 5,536,131 A | 7/1996 | Behr |
| 5,562,298 A | 10/1996 | Kass et al. |
| 5,575,492 A | 11/1996 | Stone |
| 5,580,076 A | 12/1996 | DeRoule et al. |
| 5,615,813 A | 4/1997 | Ouellette |
| 5,628,525 A | 5/1997 | Kass et al. |
| 5,647,603 A | 7/1997 | Kass et al. |
| 5,660,409 A | 8/1997 | Hensley |
| 6,629,701 B1 | 10/2003 | Colibert |

SECTION A-A

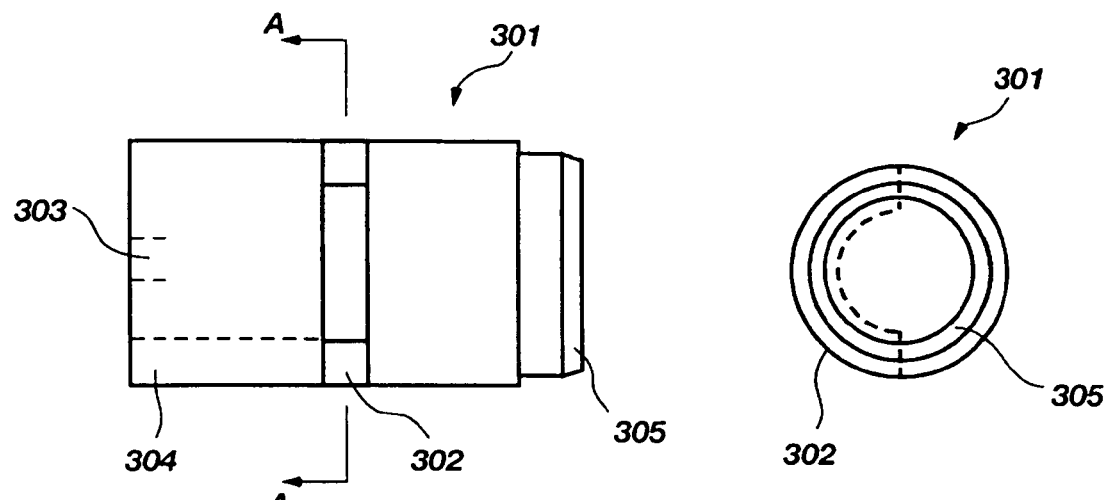
FIG. 3a
FIG. 3b
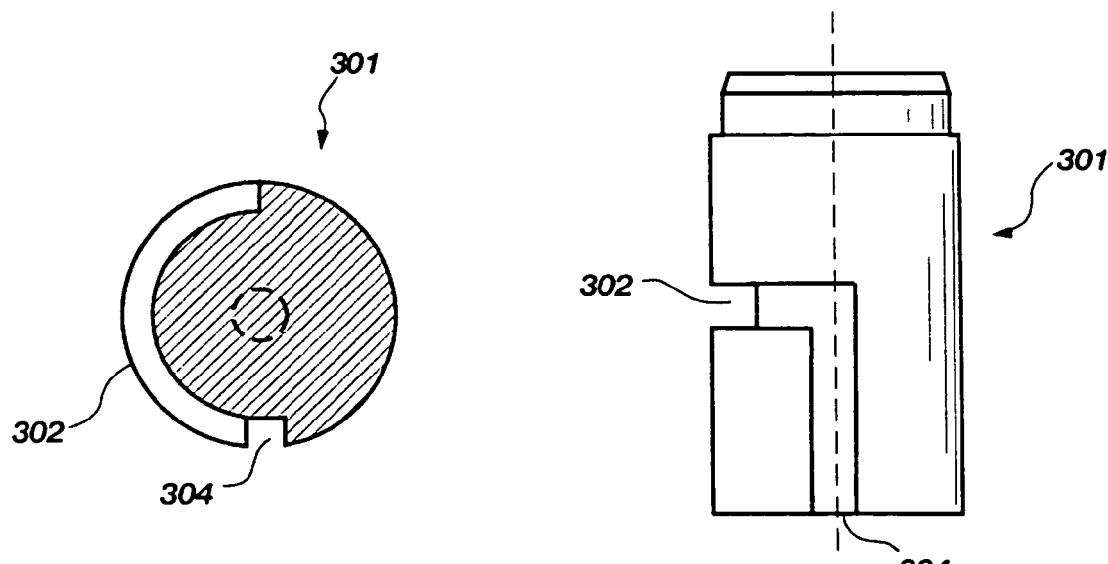
FIG. 3c
SECTION A-A
FIG. 3d

SECTION A-A

SECTION A-A

LOAD-LEVELING, WEIGHT-DISTRIBUTING HITCH SYSTEM

This is a continuation-in-part of U.S. patent application Ser. No. 10/839,071, filed May 4, 2004 now abandoned, which is a continuation-in-part of U.S. patent application Ser. No. 10/679,825, filed Oct. 6, 2003 now abandoned, which is a continuation of U.S. patent application Ser. No. 09/005,670 filed Jan. 12, 1998, now U.S. Pat. No. 6,629,701, the disclosures of which are incorporated herein by reference in their entireties.

BACKGROUND

1. Field of the Invention

The present invention relates to hitch systems for trailers. More specifically, the present invention relates to a ball-type hitch system that provides for load-leveling, sway control, and trailer tongue load distribution.

2. Related Art

A variety of trailer hitch assemblies have been developed for distributing the tongue weight of a trailer. Commonly such hitch assemblies include a hitch head, spring bars, bar restraining sockets, and lift units. The head provides the ball mount, the towing vehicle attachment, and spring bar attachments. Typically such hitch assemblies use substantially L-shaped spring bars, or use substantially rectangular sockets. If ball pivot adjustment is provided, it typically requires that the user unbolt, remove, and relocate the hitch head.

Such existing load-leveling or weight-distributing hitches are generally mechanically complex, with a large number of bolt and nut attachments to fix the hitch together. Mechanical complexity has the disadvantage of being generally less reliable. Also, the configuration of many prior weight-distributing hitches makes it relatively difficult for a user to attach the spring bars to the hitch head, or to remove the spring bars from the hitch head. This problem makes it significantly more difficult for the user to attach a trailer to a towing vehicle using a load-leveling hitch. Additionally, some prior load-leveling hitches provide limited or no tension adjustment capability.

SUMMARY

It has been recognized that it would be desirable to provide a load-leveling, weight-distributing hitch system in which the attachment and removal of the spring bars is facilitated and can be accomplished by hand, without the need for tools.

It has also been recognized that it would be desirable to provide a load-leveling, weight-distributing hitch system having enhanced reliability by minimizing the use of attachment bolts.

It has also been recognized that it would be desirable to provide a load-leveling, weight-distributing hitch system having the capability of spring bar tension adjustment and adjustment of the pitch of the ball hitch.

The present invention advantageously provides a load-leveling, weight-distributing hitch system including a hitch head, configured for attachment to a rear of a towing vehicle, a T socket, horizontally pivotally attached to the hitch head, a spring bar, having a forward end removably attached to the T socket, a tension member, connected to a rearward end of the spring bar, and a spring bar lift, configured for attachment to a tongue of a trailer. The spring bar lift is configured to apply tension to the tension member, so as to lift the rearward end of the spring bar, and thereby transmit a moment to the hitch head tending to lift the rear of the towing vehicle.

According to a more detailed aspect thereof, the system includes a quick-connect, quick-disconnect system for attaching the spring bars to the T sockets, without the need for tools.

According to another more detailed aspect thereof, the system includes a sway control adjustment device, whereby rotational resistance to the spring bars can be adjusted.

According to another more detailed aspect thereof, the system provides an adjustment mechanism, associated with the hitch head, configured for adjusting a vertical pitch of the hitch head and the ball hitch relative to the towing vehicle.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1b is a side view of the hitch system of FIG. 1a.

FIG. 2b is a right side cross-sectional view of the hitch head, taken along the line A-A in FIG. 2a.

FIG. 3a is a front view of the T socket component of the hitch system of FIG. 1.

FIG. 3b is a top view of the T socket post of FIG. 3a.

FIG. 3c is a top cross-sectional view of the T socket post of FIG. 3a.

FIG. 3d is a right side view of the T socket post of FIG. 3a.

FIG. 4b is a front cross-sectional view of the T socket of FIG. 4a.

FIG. 5b is a front view of the spring bar of FIG. 5a.

FIG. 6b is a top view of the spring bar lift component of FIG. 6a.

FIG. 7b is a side cross-sectional view of the spring bar lift lock component of FIG. 7a.

DETAILED DESCRIPTION

Figure 1A:
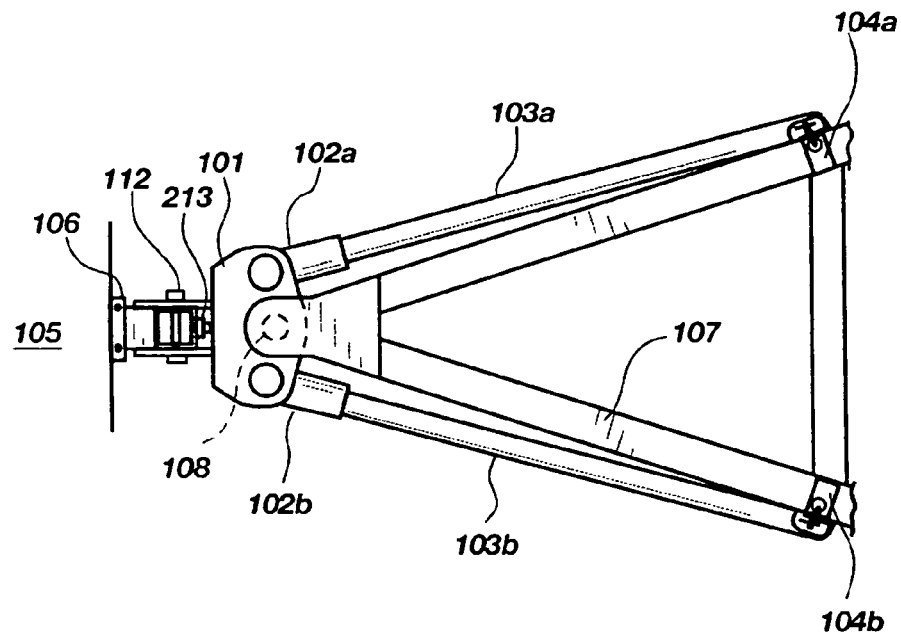
FIG. 1a is a top view of one embodiment of a load-leveling, weight-distributing hitch system according to the present invention

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

This invention provides a load-leveling, weight-distributing hitch system that has enhanced strength, reliability, ease of use, and ease of adjustment compared to other prior weight-distributing hitches. The hitch system includes a quick-connect, quick-disconnect spring bar attachment, a thumb screw ball hitch pitch adjustment, a spring bar lift having the ability to adjust the tension imposed on the spring bar, and a spring bar lift lock.

Figure 1B:
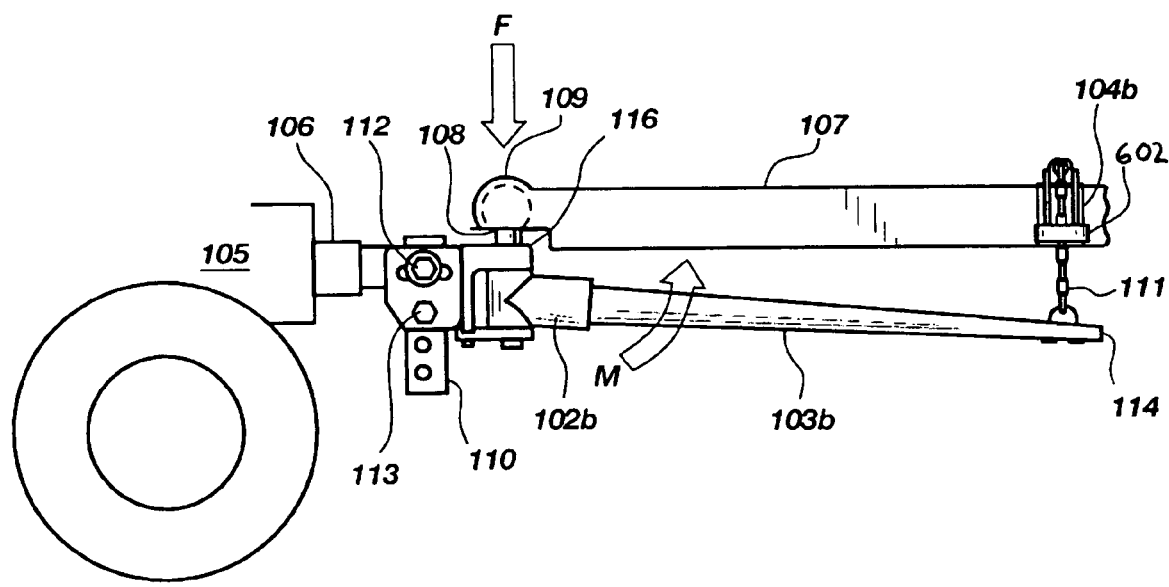
Figure 2A:
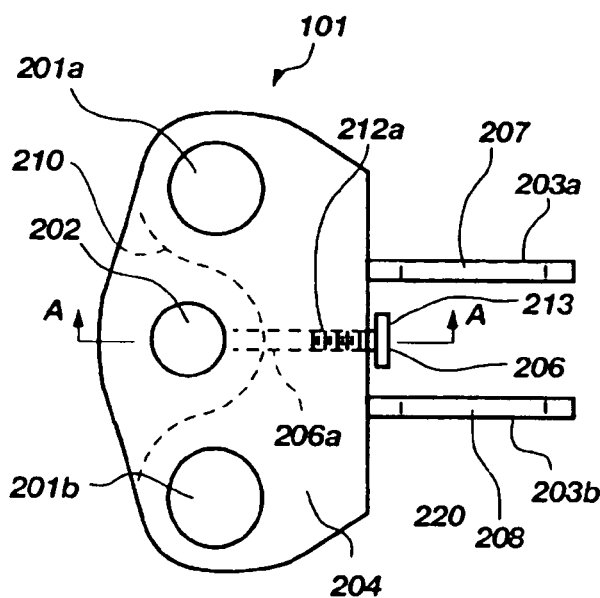
FIG. 2a is a top view of the hitch head component of the hitch system of FIG. 1.
Figure 2B:
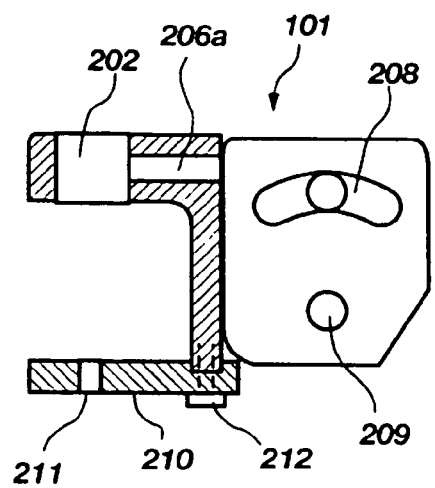
Figure 2D:
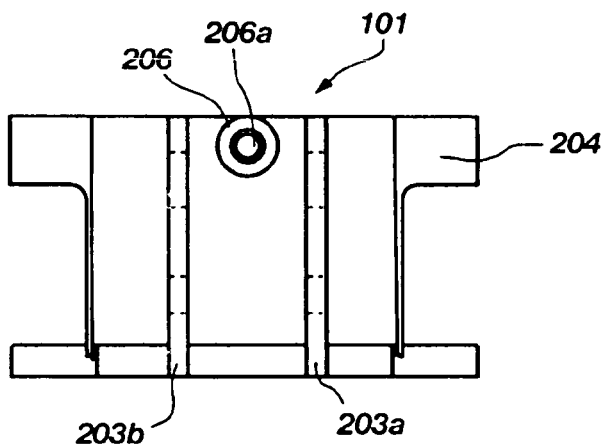
FIG. 2d is a rear view of the hitch head.
Figure 2C:
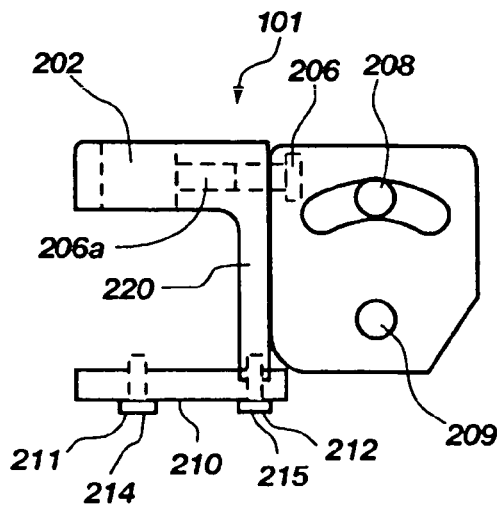
FIG. 2c is a right side view of the hitch head.
Figure 2E:
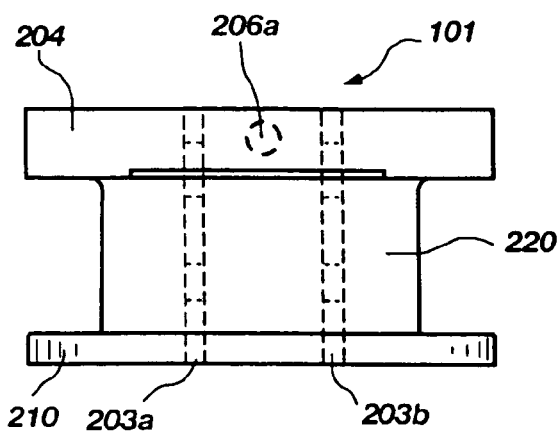
FIG. 2e is a front view of the hitch head.

FIGS. 1a and 1b depict one embodiment of a load-leveling, weight-distributing hitch system in accordance with the present invention, showing the hitch system being used to connect a towing vehicle 105 to the tongue 107 of a trailer. FIG. 1a is a top view of the system, and FIG. 1b is a side view. The hitch system generally includes a hitch head 101, with a hitch ball 108 disposed thereatop, and a pair of spring bars 103 horizontally pivotally connected to the hitch head and rearwardly extending therefrom. Spring bar lifts 104 are attached to the tongue 107 of the trailer, and a flexible tension member (e.g. a chain 111) connects each spring bar lift to the rearward or trailer end 114 of each spring bar. By imposing both a vertical trailer load F and a counter-clockwise (as viewed in FIG. 1b) moment M upon the hitch head, the system helps distribute weight from the tongue of the trailer to the towing vehicle, and helps level out the vehicle-trailer connection by lifting the rear of the towing vehicle, so as to reduce sag at the trailer hitch point. The invention also helps control sway or lateral swinging of the trailer relative to the towing vehicle.

As shown in FIGS. 1a and 1b, the towing vehicle 105 has a standard hitch receiver 106 which is attached to an adjustable shank 110. The shank is fixed by bolts 112, 113 to the hitch head 101, which has two pivotal "T" sockets 102a, 102b. Each "T" socket is shown having received the forward ends of the spring bars 103a, 103b. Each spring bar has a chain 111 attached to its rearward or trailer end 114. It will be apparent that some other type of flexible tension member, such as a cable, could be substituted in place of the chain. The chains are connected to the trailer tongue 107 via spring bar lifts 104a, 104b. Each spring bar lift has a sway control bracket 115 which is provided to hold the chain against the side of the trailer tongue, thereby helping to control trailer sway. The trailer tongue includes a socket 109 that fits over a standard hitch ball 108, so as to connect the trailer to the towing vehicle. In one embodiment of the invention, the component parts of the hitch system are composed of steel, though other materials, including synthetics, could be used without departing from the scope of the invention.

FIGS. 2a-2e show various views of the hitch head 101. A variety of hitch head sizes can be employed, depending on the size and configuration of the ball hitch, the trailer tongue, and the desired spring bar pitch and tension. The hitch head generally includes a top plate 204, a bottom plate 210, a back plate 220, and two shank mount plates 203a, 203b. The top plate includes three openings—a ball hitch attachment opening 202, which receives the ball stem 116, and two T-socket post holes 201a, 201b for receiving the T socket posts (301 in FIG. 3). In the embodiment shown in the figures, the back plate is integral with the top plate. The bottom plate is fixed to the bottom of the back plate with bolts 215 provided through bolt openings 212, and fixed to the bottoms of the T-socket posts by bolts 214 provided through bolt openings 211.

The two shank mount plates 203a, 203b provide a mount for mounting the hitch head 101 to the adjustable shank 110. The two shank mount plates are attached (e.g. welded) to the back plate 220, and each include two bolt openings 208, 209 for fixing the hitch head to the shank. The top bolt opening 208 defines an arcuate slot, having a center of curvature at the center of the lower bolt opening 209, which allows the hitch head to pivot about the lower bolt (113 in FIG. 1b), providing the user/installer with the capability of adjusting the pitch of the hitch head (and the ball hitch 108) relative to the vehicle 105.

Adjustment of the pitch of the hitch head 101 is facilitated by a thumb screw 206 having a drive end 212a and a thumb head end 213. The drive end is installed through a threaded opening 206a in the rear plate 220 and the top plate 204 of the hitch head. The thumb head end of the thumb screw is configured to press against the shank 110. Adjustment of the pitch of the hitch head and ball hitch 108 is accomplished by turning the thumb head end of the thumb screw, so as to cause the thumb screw to twist into or out of the threaded opening, thereby pressing against the shank and causing the hitch head to pitch down or up with respect to the shank, the hitch head pivoting on the bottom bolt 113. When the hitch head is oriented at the desired pitch, the top bolt 112 and bottom bolt can be tightened to fix the hitch head in place.

Figure 4A:
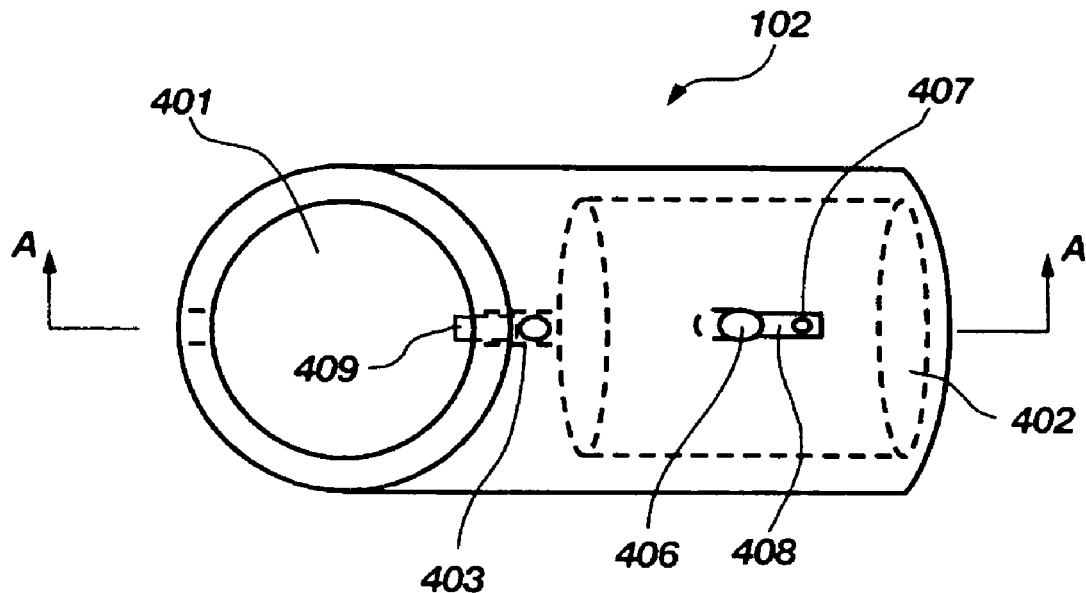
FIG. 4a is a top view of the T socket component of the hitch system of FIG. 1.
Figure 4B:
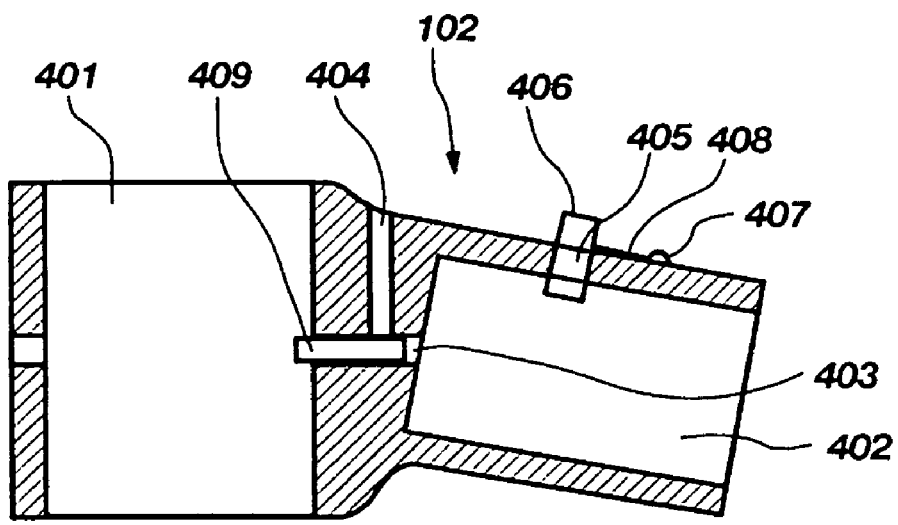

As shown in FIG. 1a, the T sockets 102 are pivotally attached to the hitch head 101 between the top plate 204 and bottom plate 210. The T-sockets pivot horizontally, but not vertically, thus allowing them to transmit vertical moment (M in FIG. 1b). FIG. 4 provides several views of the T socket, and FIG. 3 provides several views of the T socket post 301. The T sockets are pivotally attached to the hitch head by the T socket posts, which are attached between the top plate and bottom plate of the hitch head. Each T socket post comprises a substantially cylindrical body having a tapered top end 305 which is configured to be press fitted into the post opening (201 in FIG. 2a) of the hitch head. Once press fitted in, the T socket post can be attached securely (e.g. welded) into place. A bolt hole opening 303 is provided in the T socket posts in the event that the bottom or sway control plate (210 in FIG. 2a) is used, in which case bolts extend through the bolt hole openings 211 in the bottom plate and into the bolt hole openings of the T socket posts. The T socket post is preferably made from polished high strength steel, though alternative materials could be used without departing from the scope of this invention.

Referring to both FIGS. 3 and 4, each T socket 102 generally comprises a unitary body having a substantially vertical, cylindrical tube opening 401, and a substantially horizontal, but slightly downwardly angled cylindrical spring bar opening 402. The T-socket can be of cast steel, though other materials can be used. The tube opening is configured to receive the T socket post 301, upon which the T socket pivots. A pin opening 403 is provided in the side wall of the tube opening, and includes a T-socket pin 409 that extends into the tube opening. A set screw opening 404 is provided to receive a set screw for fixing the T-socket pin 409 in place. The T socket pin is configured to slide into a T-socket rotation slot 302 formed in the side of the body of the T socket post, to permit the T-socket to pivot about the T socket post, yet limit the range of pivoting. The T-socket rotation slot extends about halfway around the T-socket post, and thus allows the T-socket to pivot approximately 180 degrees about the T-socket post. The combination of the T-socket pin and the T-socket rotation slot advantageously allows the spring bars 103 to be rotated horizontally away from the trailer, thereby aiding in the installation and removal of the spring bars.

The T socket post 301 also includes a T-socket installation slot 304 extending downwardly from the T socket rotation slot 302. The T-socket installation slot is configured to facilitate installation of the T socket 102 upon the T socket post. As the T socket is slid onto the T socket post, the T socket pin 409 must be aligned with the T socket installation slot, so as to pass up therethrough, until reaching the T-socket rotation slot, whereupon the T socket can be rotated slightly to allow the T socket pin to engage the T socket rotation slot.

Figure 5A:
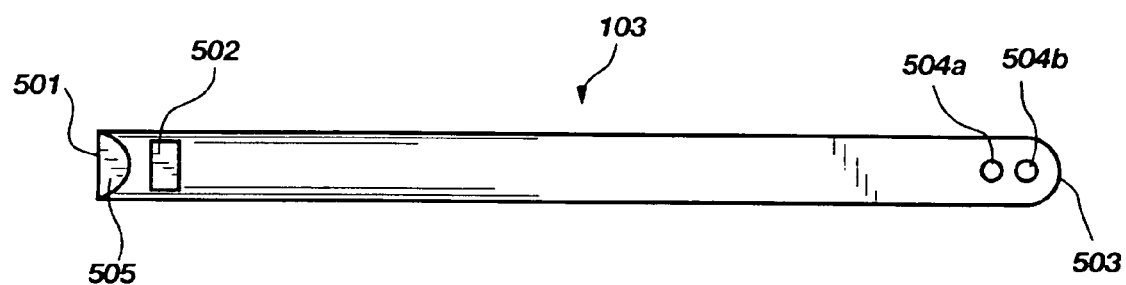
FIG. 5a is a top view of the spring bar component of the invention.
Figure 5B:
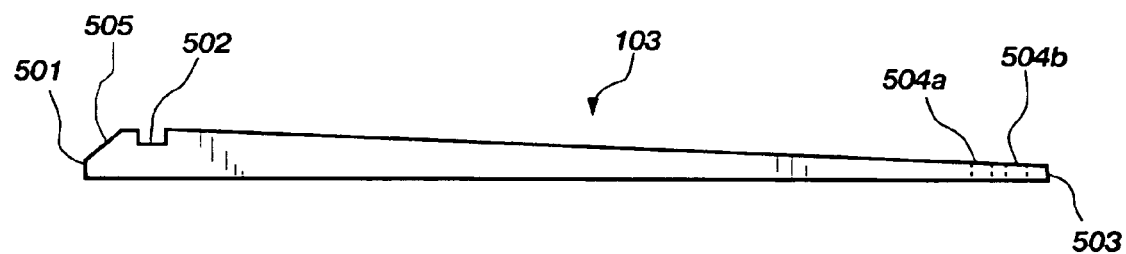
Figure 6A:
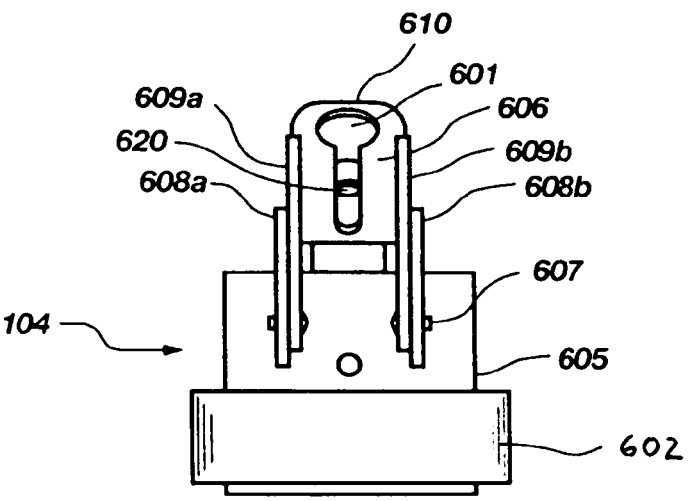
FIG. 6a is a front view of the spring bar lift component of the hitch system of FIG. 1.
Figure 6B:
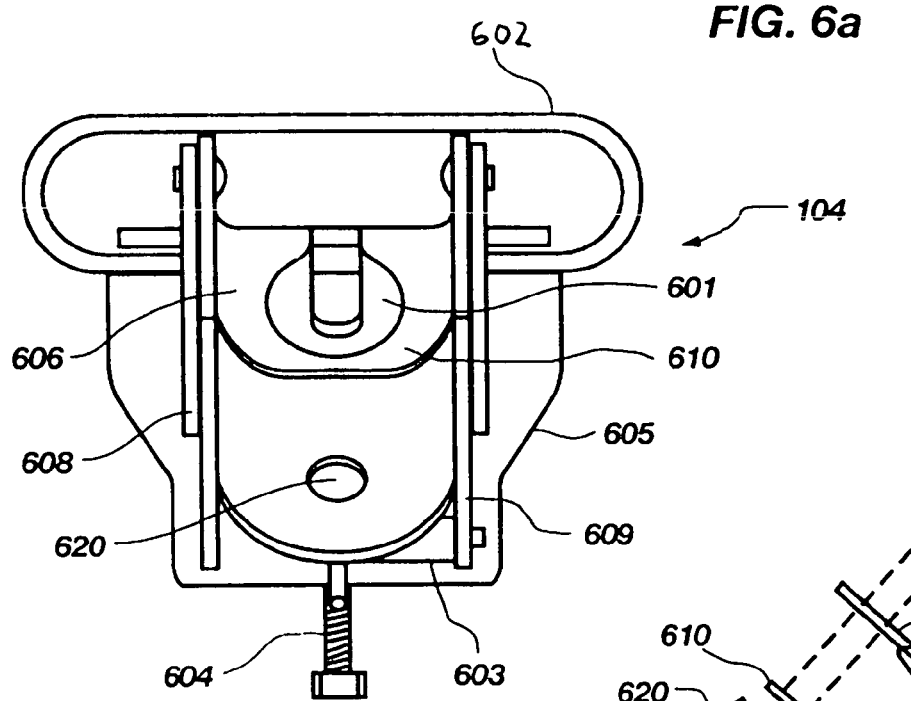
Figure 6C:
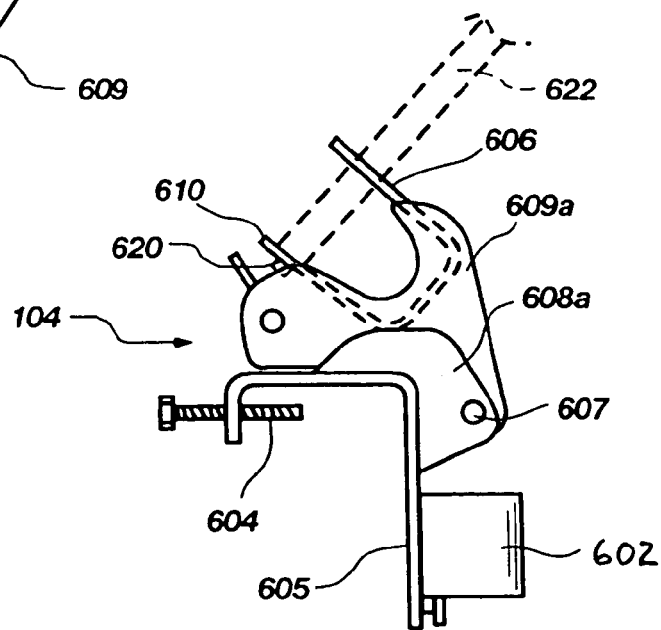
FIG. 6c is a left side view of the spring bar lift component of FIG. 6a, with the chain latch in the closed and locked position.
Figure 6D:
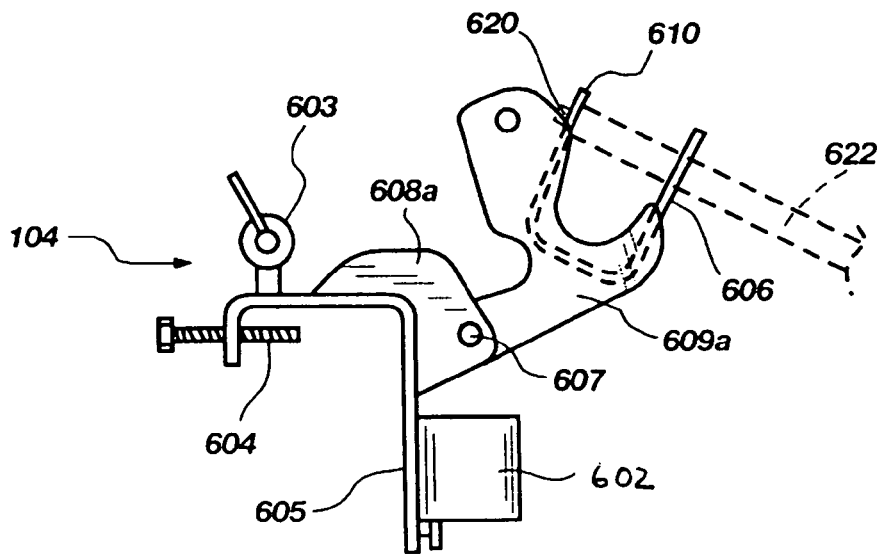
FIG. 6d is a left side view of the spring bar lift component of FIG. 6a with the chain latch in the open position.

Referring now to FIG. 4 and FIG. 5, the spring bar opening 402 of the T socket 102 is provided to receive the first or forward end 501 of the spring bar 103. The spring bar opening is pitched downward slightly, so that an installed spring bar will have a slight downward angle. Disposed in the side wall of the spring bar opening is a retainer pin opening 405. Disposed within this opening is a retainer pin 406, which extends into the spring bar opening, and is held in place by a spring 408 attached via a pin 407 to the outside of the T-socket 102. The retainer pin is configured to extend into a retainer pin slot 502 formed in the forward end of the spring bar. The spring-loaded retainer pin provides a selectively releasable catch mechanism that provides a quick-connect/quick-disconnect for the spring bars.

To install a spring bar 103 in the T socket 102, a user first inserts the forward end of the spring bar into the spring bar opening 402. The forward end 501 of the spring bar advantageously includes a taper 505. By pushing the spring bar straight into the spring bar opening, the taper on the spring bar contacts the retainer pin 406 and forces it up into the retainer pin opening 405, so that the retainer pin is not in an interfering position. However, as the spring bar is pushed forward to the point that the retainer pin slot 502 is aligned with the retainer pin (i.e. a forward locking position), the retainer pin snaps down into the retainer pin slot to lock the spring bar in the T socket. To remove the spring bar 103, the user simply twists the spring bar about its long axis in either direction. Rotation of the spring bar causes the bottom surface of the retainer pin slot 502 to rotate and act as a wedge against the retaining pin 406, forcing the retaining pin upwards, back into the non-interfering position, thereby unlocking and releasing the spring bar. In this position, the spring bar may be easily removed from the spring bar opening. In one embodiment of the invention, the spring bar 103 is made of steel, although other materials can be used.

Because of this design, the spring bars 103 can be easily removed from the hitch head 101 when the load-leveling, weight-distributing hitch is not in use. One advantage of the present invention is that lubricating grease and the like that is associated with the hitch head and allows horizontal pivoting of the spring bars is not directly in contact with the spring bars. Instead, any lubrication required is provided between the T sockets 102 and T socket posts 301. Thus the spring bars will not present greasy, dirty ends, which are a nuisance when the spring bars are removed. Additionally, the removal of the spring bars is quick and does not require the use of any tools (e.g. wrenches, screwdrivers, etc.). Instead, the user simply grasps the spring bar and twists it until the retaining pin 406 is released, then pulls the bar out of the spring bar opening 402.

The bottom plate 210 of the hitch head 101 holds the T sockets in place upon the T socket posts, and also functions as a sway control adjustment plate. That is, the resistance to horizontal pivoting of the T sockets 102 (and hence of the spring bars 103) with respect to the hitch head can be adjusted via the bottom plate. As noted above, the bottom plate is attached to the back plate 220 of the hitch head via bolts 215, and to the T Socket posts via bolts 214. A user can adjust the resistance to pivoting of the T sockets by tightening or loosening these bolts. Tightening of these bolts increases friction against the sockets, which increases resistance to pivoting. It will be apparent that in certain circumstances, a trailer can tend to sway or swing from side to side with respect to its towing vehicle. This can occur during braking, cornering, or in other circumstances, and can be dangerous. The present invention helps provide some resistance to this swinging by allowing adjustment of the freedom of horizontal swinging of the T sockets, and hence of the Spring bars.

Referring now to FIGS. 5 and 6, the second or rearward end 114 of the spring bar 103 includes two holes 504*a*, 504*b*, which provide an access for attaching a lower end of a tension member, which is depicted as a chain 111. The upper end of the tension member is attached to a spring bar lift 104 that is attached to the tongue 107 of the trailer to be towed by the vehicle 105. The spring bar lift has an open position, shown in FIG. 6*d*, and a closed or locked position shown in FIG. 6*c*. The spring bar lift generally comprises an inverted U-shaped base plate 605, adapted to fit over the trailer tongue, and a pivotable chain latch 606 which pivots about a hinge 607 that is attached to the base plate via brace members 608*a*, 608*b*. A clamp bolt 604 extends through the base plate for fixing the spring bar lift to the trailer tongue. The pivotable chain latch 606 is a three piece structure having two side portions 609*a*, 609*b* and a center portion 610. The center portion includes a chain opening slot 601 that is configured to receive one or more links of the chain 111.

It will be apparent that other mechanisms or systems for attaching the tension member to the latch 606 can be used, whether or not a chain is used as the tension member. For example, the tension member can include a loop, hook, or other connector at its top end, which can be placed upon a hook or comparable structure associated with the latch. Alternatively, a bolt, screw, or other connector can be used to connect the tension member to the latch. Other configurations are also possible.

The spring bar lift is used as follows. After attaching the chain 111 to the rearward end 114 of the spring bar, with the spring bar lift 104 in the open position, the user pulls the chain through the wide upper portion of the chain opening 601 until the chain is hand-taut. The user then slides the tightest available link of the chain sideways into the narrow portion of the chain opening. This link is locked into the chain opening by virtue of the preceding connected link, which essentially provides a transverse locking bar. The user then rotates the spring bar lift to the closed or locked position. This is done by inserting a lock bar 622 or other lever device through the wide portion of the chain opening, and fitting a distal end of the bar into a lock bar slot 620. The user then pushes upward on the bar, causing the chain latch 606 to rotate and pull the chain upward, putting tension on the chain and thus pulling upward on the spring bars 103. The closed or locked position of the chain latch is slightly past a maximum tension position of the chain, so that the tension on the chain will naturally hold the latch in the closed position.

Figure 7A:
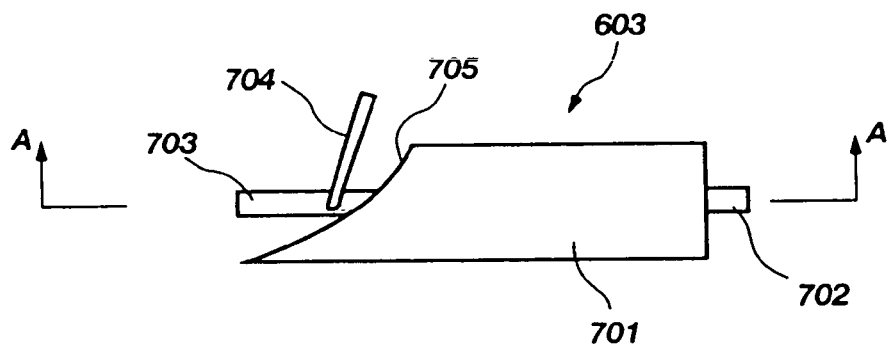
FIG. 7a is a side view of the spring bar lift lock component of the hitch system of FIG. 1.
Figure 7B:
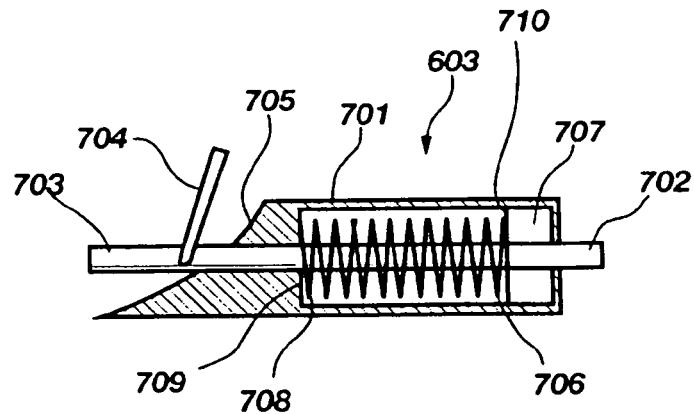

A lift lock 603 is attached to the base plate 605, and is configured to lock the chain latch 606 in the closed position. The lift lock is shown in detail in FIGS. 7*a* and 7*b*. The lift lock comprises a body 701 within which is installed a pivot pin 703. The pivot pin is held in a normally locked position by an internal spring 706 disposed within the body. One end 708 of the spring is disposed against one interior wall 709 of the body, and the other end 706 of the spring is disposed against an interior face 710 of a piston 707 that is attached to the pivot pin within the interior of the body. The exterior of the body of the lift lock includes a tapered face 705, through which the pivot pin extends. Attached to the external portion of the pivot pin is a lift lock lever 704, the base of which is disposed against the tapered face.

Attached to the piston 707 and extending through the opposite end of the body 701 of the lift lock 603 is a locking post 702 that is configured to fit through a locking opening 608 in one side portion 609a of the chain latch. When the chain latch is rotated to the closed position, the locking post snaps into the locking opening under the force of the spring 706, and locks the chain latch in place. The lift lock is shown in the locked position in FIG. 7a, with the locking post extended and the lift lock lever 704 in an upward orientation. To unlock the lift lock and allow the chain latch to be rotated to the open position, a user rotates the lift lock lever to a downward position (shown in dashed lines in FIG. 7a). Because the lift lock lever is in contact with the tapered face 705 of the lift lock body, rotation of this lever draws the pivot pin out of the body against the force of the spring, and thereby draws the locking post out of the locking opening, thereby allowing the pivotable chain latch 606 to be rotated to the open position, so as to relax the tension on the chain 111.

Referring back to FIG. 6, the spring bar lift of the present invention provides several advantages. First, the spring bar lift includes a chain retention loop 602, which comprises a generally oval loop welded to the spring bar lift base plate 605, through which the chain 111 is inserted. Placement of the chain through the chain retention loop reduces movement of the chain, which helps maintain chain tension during sway of the trailer.

It is to be understood that the above-referenced arrangements are illustrative of the application of the principles of the present invention. While the present invention has been shown in the drawings and described above in connection with the exemplary embodiments(s) of the invention, numerous modifications and alternative arrangements can be devised without departing from the scope of the invention. It will be apparent to those of ordinary skill in the art that numerous modifications can be made without departing from the principles and concepts of the invention as set forth in the claims.

What is claimed is:

1. A load-leveling, weight-distributing hitch system, comprising:
    a) a hitch head, configured for attachment to a rear of a towing vehicle;
    b) a T socket, horizontally pivotally attached to the hitch head;
    c) a spring bar, having a forward end removably attached to the T socket;
    d) a tension member, connected to a rearward end of the spring bar;
    e) a spring bar lift, configured for attachment to a tongue of a trailer, configured to apply tension to the tension member, so as to lift the rearward end of the spring bar, and thereby transmit a moment to the hitch head tending to lift the rear of the towing vehicle; and
    f) an adjustment mechanism, associated with the hitch head, configured for adjusting a vertical pitch of the hitch head relative to the towing vehicle, said adjustment mechanism comprising an arcuate slot that facilitates selective positioning of the hitch head in one of an infinite number of vertical pitch orientations as constrained by said arcuate slot, said adjustment mechanism comprising an adjustment member supported by the hitch head and configured to press against a shank associated with the towing vehicle to determine a pivotal orientation of the hitch head depending upon a degree of adjustment of the adjustment member.

2. A system in accordance with claim 1, further comprising a ball hitch, disposed atop a hitch head.

3. A system in accordance with claim 1, wherein the adjustment member comprises a thumb screw, threadedly disposed in the hitch head, having a head end configured to press against the shank associated with the towing vehicle, so as to determine the pivotal orientation of the hitch head depending upon a degree of extension of the thumb screw.

4. A system in accordance with claim 1, wherein the adjustment mechanism comprises:
    a) a shank, associated with the towing vehicle, the hitch head being attached to the shank;
    b) a hitch head mount, configured to attach the hitch head to the shank, configured to affix the hitch head to the shank in a selected pivotal orientation; and
    c) a thumb screw, threadedly disposed in the hitch head, having a head end configured to press against the shank, such that rotation of the thumb screw in a first direction causes the hitch head to pitch rearwardly downward, and rotation of the thumb screw in a second direction allows the hitch head to be rotated forwardly upward, so as to control the pitch of the ball hitch.

5. A system in accordance with claim 1, wherein the spring bar is attachable to and disconnectable from the T socket without tools.

6. A system in accordance with claim 5, wherein the T socket comprises a spring bar opening, configured to receive the forward end of the spring bar when substantially linearly inserted thereinto, and configured to allow disconnection of an inserted spring bar when the spring bar is axially rotated and substantially linearly retracted therefrom.

7. A system in accordance with claim 5, wherein the T socket comprises a quick-connect, quick-disconnect system, comprising:
    a) a spring bar opening in the T socket, configured to slidingly receive the forward end of the spring bar thereinto;
    b) a springed retainer pin, extending into the spring bar opening, configured to engage and lock the forward end of the spring bar within the spring bar opening when the spring bar is inserted thereinto, and to be selectively disengageable to allow the spring bar to be removed from the spring bar opening.

8. A system in accordance with claim 7, further comprising:
    a) a taper, disposed on the forward end of the spring bar, configured to push the retainer pin to a non-interfering position during forward insertion of the spring bar;
    b) a retainer pin slot, disposed on the forward end of the spring bar rearwardly of the taper, the retainer pin being configured to engage the retainer pin slot to lock the spring bar within the spring bar opening when the spring bar is pushed to a forward locking position.

9. A system in accordance with claim 8, wherein the spring bar has a long axis, and the retainer pin slot is configured to push the retainer pin to the non-interfering position when the spring bar is rotated the long axis, to allow removal of the spring bar from the spring bar opening.

10. A system in accordance with claim 5, wherein lubricating material associated with the hitch head and disposed to promote horizontal pivoting of the spring bar is associated with the T socket and substantially prevented from direct contact with the forward end of the spring bar.

11. A system in accordance with claim 1, wherein the spring bar lift comprises:
    a) a base, configured to attach to the tongue of the trailer; and
    b) a latch, pivotally attached to the base, configured to receive a top end of the tension member, and moveable between a closed position, wherein tension is applied to the tension member, so as to lift the rearward end of the spring bar, and an open position, wherein tension on the tension member is released.

12. A system in accordance with claim 11, wherein the tension member comprises a chain, having links configured to attach to the latch.

13. A system in accordance with claim 11, wherein the latch comprises an inverted U-shaped element, having a mechanism for attaching the tension member.

14. A system in accordance with claim 13, wherein the tension member comprises a chain, and the mechanism for attaching the tension member comprises a chain opening, disposed in the inverted U-shaped element, configured to receive and hold a link in the chain.

15. A system in accordance with claim 13, further comprising an opening in a first side of the inverted U-shaped element, and a lock bar slot disposed in a second side of the inverted U-shaped element, whereby a lock bar may be inserted through the opening and fitted into the lock bar slot, to allow greater rotational force to be applied to the latch when closing the latch.

16. A system in accordance with claim 12, further comprising a spring bar lift lock, attached to the base, configured to releasably lock the latch in the closed position.

17. A system in accordance with claim 1, wherein the spring bar lift comprises a retention loop, the tension member being inserted therethrough, configured to reduce movement of the tension member to help maintain tension during sway of the trailer.

18. A system in accordance with claim 1, further comprising a sway control adjustment mechanism, associated with the hitch head, configured to allow adjustment of resistance to horizontal pivoting of the T socket.

19. A system in accordance with claim 18, wherein the sway control mechanism comprises a bottom plate, attached to the hitch head, disposed adjacent to the T socket, and having an adjustment mechanism, configured to adjust friction against the T socket, so as to allow adjustment of the freedom of horizontal pivoting of the T socket.

20. A system in accordance with claim 1, wherein the T socket comprises a pair of T sockets, the spring bar comprises a pair of spring bars, the tension member comprises a pair of tension members, one associated with each spring bar, and the spring bar lift comprises a pair of spring bar lifts, each spring bar lift being configured to attach to a laterally-spaced portion of the trailer tongue, and to receive one of the tension members.

21. A load-leveling, weight-distributing hitch system, comprising:
a) a hitch head, attached to a rear of a towing vehicle, configured to receive a trailer tongue;
b) a T socket, horizontally pivotally attached to the hitch head, configured for receiving an end of a spring bar, and configured to transmit vertical moment to the hitch head;
c) a spring bar, having a first end and a second end, the first end being removably received in the T socket;
d) a spring bar lift, attached to the trailer tongue;
e) a tension member, having a lower end connected to the second end of the spring bar, and an upper end connected to the spring bar lift, the spring bar lift having a closed position wherein tension is applied to the tension member, so as to lift the second end of the spring bar relative to the trailer tongue, and thereby transmit a moment to the hitch head tending to lift the rear of the towing vehicle; and
f) an adjustment mechanism, associated with the hitch head, configured for adjusting a vertical pitch of the hitch head relative to the towing vehicle, said adjustment mechanism comprising an arcuate slot that facilitates selective positioning of the hitch head in one of an infinite number of vertical pitch orientations as constrained by said arcuate slot, said adjustment mechanism comprising an adjustment member supported by the hitch head and configured to press against a shank associated with the towing vehicle to determine a pivotal orientation of the hitch head depending upon a degree of adjustment of the adjustment member.

22. A system in accordance with claim 21, wherein the T socket comprises a pair of T sockets, the spring bar comprises a pair of spring bars, the tension member comprises a pair of tension members, one associated with each spring bar, and the spring bar lift comprises a pair of spring bar lifts, each spring bar lift being configured to attach to a laterally-spaced portion of the trailer tongue, and to receive one of the tension members.

23. A load-leveling, weight-distributing hitch system, comprising:
a) a towing vehicle, having a rear;
b) a trailer, having a trailer tongue including a frame;
c) a hitch head, attached to the rear of the towing vehicle;
d) a ball hitch disposed atop the hitch head, configured to receive the trailer tongue;
e) a pair of T sockets, horizontally pivotally attached to the hitch head, each configured for receiving an end of a spring bar, and configured to transmit vertical moment to the hitch head;
f) a pair of spring bars, each having a first end and a second end, the first end of each spring bar being removably received within a respective one of the T sockets;
g) a pair of spring bar lifts, attached to opposing lateral sides of the frame of the tongue of the trailer;
h) a pair of tension members, each having a lower end connected to the second end of a respective one of the spring bars, and an upper end connected to a respective one of the spring bar lifts, the spring bar lifts being selectively adjustable between a closed position, wherein tension is applied to the respective tension member, so as to lift the second end of the respective spring bar relative to the trailer tongue frame, to thereby transmit a moment to the hitch head tending to lift the rear of the towing vehicle, and an open position, wherein tension on the respective tension member is released; and
i) an adjustment mechanism, associated with the hitch head, configured for adjusting a vertical pitch of the hitch head relative to the towing vehicle, said adjustment mechanism comprising an arcuate slot that facilitates non-discrete infinitely variable pitch adjustment of the hitch head as constrained by the arcuate slot, said adjustment mechanism comprising an adjustment member supported by the hitch head and configured to press against a shank associated with the towing vehicle to determine a pivotal orientation of the hitch head depending upon a degree of adjustment of the adjustment member.

* * * * *